(12) United States Patent
Gutierrez et al.

(10) Patent No.: US 12,554,663 B2
(45) Date of Patent: Feb. 17, 2026

(54) HOST CONTROLLER AND BUS-ATTACHED PERIPHERAL DEVICE POWER CONSUMPTION REDUCTION

(71) Applicant: Advanced Micro Devices, Inc., Santa Clara, CA (US)

(72) Inventors: Raul Gutierrez, Santa Clara, CA (US); Indrani Paul, Austin, TX (US); Joseph Scanlon, Santa Clara, CA (US); Aniruddha Dasgupta, Austin, TX (US); Madhusudan Chilakam, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/682,527

(22) Filed: Feb. 28, 2022

(65) Prior Publication Data
US 2023/0273890 A1    Aug. 31, 2023

(51) Int. Cl.
*G06F 13/38* (2006.01)
*G06F 13/20* (2006.01)

(52) U.S. Cl.
CPC ............ *G06F 13/385* (2013.01); *G06F 13/20* (2013.01); *G06F 2213/0042* (2013.01)

(58) Field of Classification Search
CPC . G06F 13/385; G06F 13/20; G06F 2213/0042
See application file for complete search history.

(56) References Cited

U.S. PATENT DOCUMENTS

| | | | |
|---|---|---|---|
| 8,862,909 B2 | 10/2014 | Branover et al. | |
| 9,229,516 B2* | 1/2016 | Hiltunen | G06F 1/32 |
| 9,292,073 B2* | 3/2016 | Wang | G06F 1/3234 |
| 9,490,791 B2 | 11/2016 | Liu et al. | |
| 9,804,660 B2* | 10/2017 | Jeong | G06F 1/3287 |
| 9,946,325 B2* | 4/2018 | Leucht-Roth | G06F 1/3278 |
| 10,187,401 B2* | 1/2019 | Machlica | H04L 67/02 |
| 10,805,319 B2* | 10/2020 | Kim | H04L 63/1458 |
| 11,054,887 B2 | 7/2021 | Tsien et al. | |
| 2004/0221185 A1* | 11/2004 | Bose | G06F 9/3869 713/300 |
| 2006/0123180 A1* | 6/2006 | Derr | G06F 13/28 710/308 |

(Continued)

*Primary Examiner* — Henry Tsai
*Assistant Examiner* — Aurangzeb Hassan
(74) *Attorney, Agent, or Firm* — Kowert, Hood, Munyon, Rankin & Goetzel, P.C.; Rory D. Rankin

(57) ABSTRACT

Systems, apparatuses, and methods for a host controller inferring idleness based on activity generated by a bus-attached peripheral device are disclosed. A host controller detects activity by a first device attached to the host controller via a first bus. The host controller generates an activity vector based on the detected activity, and the host controller determines whether the activity vector indicates that the first device is only engaging in handshaking or control activity rather than data transfer. If the first device is merely communicating status information, then the host controller infers idleness and conveys an idleness indicator to a power manager. The power manager turns off power to system memory and/or other components based on the idleness indicator, but keeps enough power on to allow the host controller to communicate with the first device for handshaking or status purposes.

19 Claims, 9 Drawing Sheets

(56) References Cited

U.S. PATENT DOCUMENTS

| | | | | |
|---|---|---|---|---|
| 2013/0073889 A1* | 3/2013 | Rauschmayer | ....... | G06F 1/3287 |
| | | | | 713/300 |
| 2013/0262956 A1* | 10/2013 | Haywood | ............ | G11C 7/1072 |
| | | | | 714/763 |
| 2014/0181559 A1* | 6/2014 | Gough | .................. | G06F 1/3287 |
| | | | | 713/323 |
| 2014/0189403 A1* | 7/2014 | Gorbatov | .............. | G06F 1/3228 |
| | | | | 713/323 |
| 2016/0313943 A1* | 10/2016 | Hashimoto | .......... | G06F 16/1847 |
| 2017/0185094 A1* | 6/2017 | Atkinson | ................. | G06F 1/263 |
| 2018/0249435 A1* | 8/2018 | Yu | ........................... | H04W 4/80 |
| 2019/0354153 A1* | 11/2019 | Hauser | .................... | G06F 8/654 |
| 2021/0181994 A1* | 6/2021 | Jean | ........................ | G06F 3/064 |
| 2021/0204212 A1* | 7/2021 | Kumar | .............. | H04W 52/0229 |
| 2021/0232873 A1* | 7/2021 | Kothari | .................... | G09B 9/00 |
| 2021/0312962 A1* | 10/2021 | Singhal | ................ | G11C 7/1084 |
| 2022/0147254 A1* | 5/2022 | Kang | ...................... | G06F 3/0613 |
| 2022/0197367 A1* | 6/2022 | Kirubakaran | ......... | G06F 1/3287 |
| 2022/0239831 A1* | 7/2022 | Hosoe | ..................... | H04L 69/22 |
| 2022/0300061 A1* | 9/2022 | He | ........................ | G06F 1/3225 |
| 2022/0317757 A1* | 10/2022 | Rao | ........................ | G06F 1/3206 |
| 2023/0052957 A1* | 2/2023 | Lee | ........................ | H04W 4/029 |
| 2023/0114164 A1* | 4/2023 | Pal | ...................... | G06F 15/7807 |
| | | | | 711/118 |
| 2023/0246490 A1* | 8/2023 | Park | .................. | H04W 52/0241 |
| | | | | 455/41.2 |

\* cited by examiner

HOST CONTROLLER AND BUS-ATTACHED PERIPHERAL DEVICE POWER CONSUMPTION REDUCTION

BACKGROUND

Description of the Related Art

Computer systems include many types of computing devices, memory devices, and peripheral devices. These devices are often coupled together using a bus, communication fabric, or other mechanism. A common bus architecture is defined by the universal serial bus (USB) standard. Many computer systems incorporate a bus that complies with the USB standard. These systems include a bus controller (i.e., host controller) that manages devices connected to the bus, fabric, or communication infrastructure. Other types of bus standards are also employed in many computer systems. While many examples will be presented herein are described as complying with the USB standard, it should be understood that these are non-limiting examples. Other uses of the methods and mechanisms described herein that are compliant with other bus standards are possible and are contemplated.

Computing systems are increasingly integrating large numbers of different types of components on a single chip or on multi-chip modules. The complexity and power consumption of a system increases with the number of different types of components. Power management is an important aspect of the design and operation of integrated circuits, especially those circuits that are integrated within mobile devices. Mobile devices typically rely on battery power, and reducing power consumption in the integrated circuits can increase the life of the battery as well as decrease the heat generated by the integrated circuits. To achieve reduced power consumption, various components within an integrated circuit can go into a reduced power state or a power-gating state. As used herein, a "power-gating state" refers to a reduced power state when a component is operating in a mode in which the component is consuming less power than in a normal operating mode. For example, a "power-gating state" can involve turning off or removing power from a given component. Alternatively, a "power-gating state" can involve reducing a power supply voltage and/or reducing a clock frequency supplied to a given component. It is noted that a "power-gating state" can also be referred to as a "power-gated state", a "power-gated mode", or a "low-power state". In various embodiments, a power-gated state refers to a reduced power state in which a current state of a device or component is not retained (i.e., power that would ordinarily be used to retain such a state is removed in order to consume less power).

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for host controller inferring idleness based on activity generated by a bus-attached peripheral device are disclosed herein. In one implementation, a host controller detects activity by a first device attached to the host controller via a first bus. The host controller generates an activity vector based on the detected activity, and the host controller determines whether the activity vector indicates that the first device is only engaging in handshaking or control activity rather than data transfer. If the first device is merely communicating status information, then the host controller infers idleness and conveys an idleness indicator to a power manager. The power manager turns off power to system memory and/or other components based on the idleness indicator, but keeps enough power on to allow the host controller to communicate with the first device for handshaking or status purposes.

Figure 1:
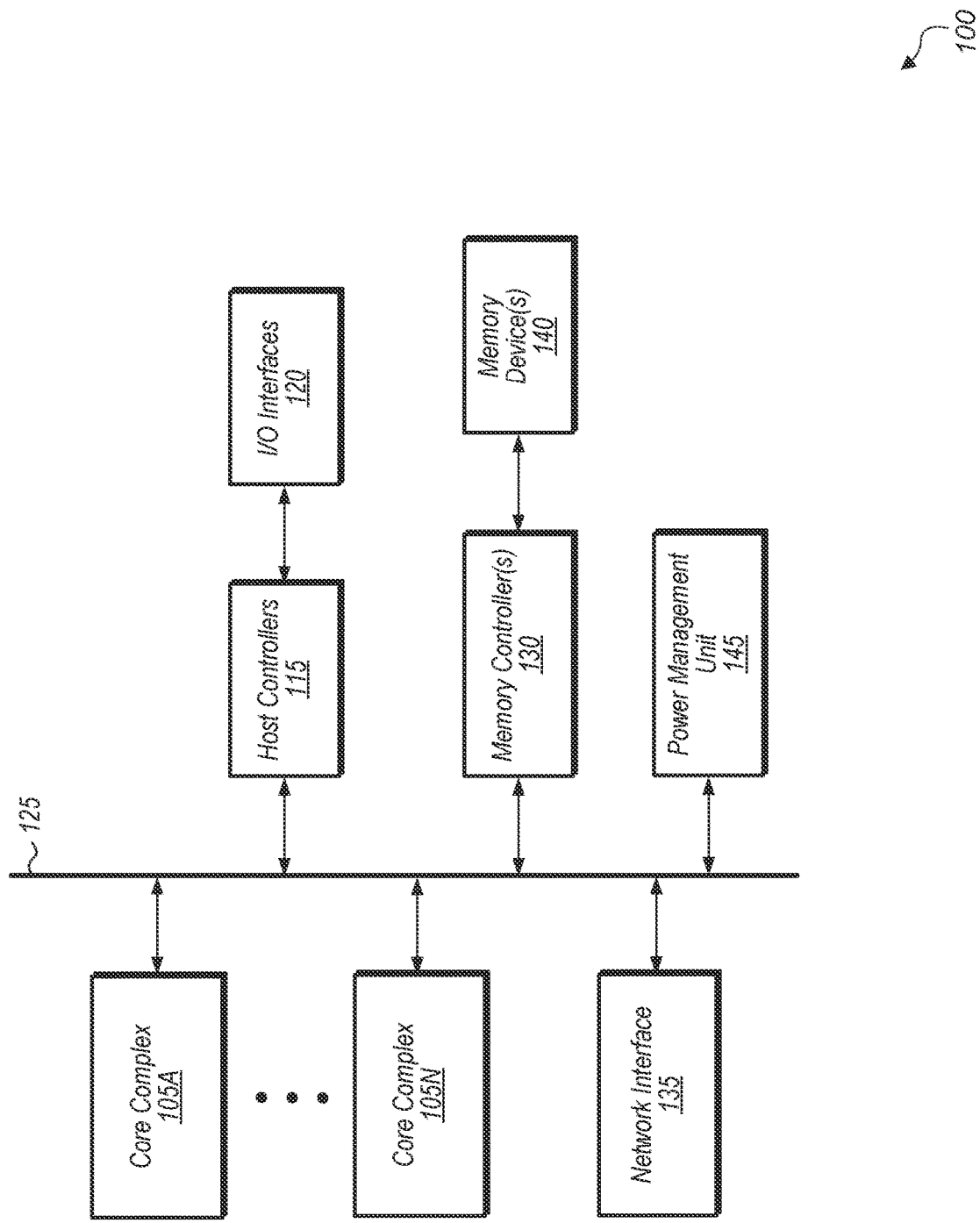
FIG. 1 is a block diagram of one implementation of a computing system.

Referring now to FIG. 1, a block diagram of one implementation of a computing system 100 is shown. In one implementation, computing system 100 includes at least core complexes 105A-N, host controllers 115, input/output (I/O) interfaces 120, bus 125, memory controller(s) 130, network interface 135, memory device(s) 140, and power management unit 145. In other implementations, computing system 100 can include other components and/or computing system 100 can be arranged differently. In one implementation, each core complex 105A-N includes one or more general purpose processors, such as central processing units (CPUs). It is noted that a "core complex" can also be referred to as a "processing node" or a "CPU" herein. In some implementations, one or more core complexes 105A-N can include a data parallel processor with a highly parallel architecture. Examples of data parallel processors include graphics processing units (GPUs), digital signal processors (DSPs), and so forth. In one implementation, each processor core within core complex 105A-N includes a cache subsystem with one or more levels of caches.

Memory controller(s) 130 are representative of any number and type of memory controllers accessible by core complexes 105A-N. Memory controller(s) 130 are coupled to any number and type of memory devices(s) 140. For example, the type of memory in memory device(s) 140 coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

Power management unit 145 is configured to manage the power consumption of the various components of system 100 by changing the power states of these components. For example, when a host controller 115 determines that an active peripheral device can actually be considered to be idle despite transmitting data, power management unit 145 can put one or more components into a low-power state to reduce the power consumption of system 100. Power management unit 145 can be coupled to any number of voltage regulators (not shown) and phase locked loops (PLLs) (not shown) for supplying power and clocks, respectively, to any number of components. For example, many communication protocols include different types of data used as part of the protocol. As an example, the USB standard includes packet types including Token Packets, Data Packets, Handshake Packets, and Start of Frame Packets. The Data Packets are used to transmit a desired data payload (e.g., data read from a memory location, etc.) while the other types of packets serve administrative or auxiliary functions to support the proper transfer of the data payload. For example, the Token Packets are used to indicate a device wishes to read data, write data, or begin a transfer; the Handshake Packets are used to provide an acknowledgement that a packet was successfully received; and so on. The USB standard is only offered as one example. Some methods and protocols do not use packets, per se, and other protocols use different types of data and/or packets. It is contemplated that the methods and mechanisms described herein are applicable to these other methods and protocols as well. As used herein, the term "auxiliary data" refers to the above described administrative and auxiliary types of data used to support the proper transfer of data payloads. In various implementations a portion of data (e.g., a packet header) is used to indicate the data of data being transmitted or included in a packet and detection of the transmission of auxiliary data is used to detect an idle state or an upcoming idle state.

As used herein, the term "low-power state" can be defined as a reduced power state for operating a component or device. In one implementation, "low-power state" involves removing power from (i.e., power-gating) the component or device. In another implementation, "low-power state" involves putting the component or device into a lower power state so as to reduce the power consumption of the component or device. For example, the component/device can be put into a lower power state by reducing the voltage and/or clock frequency supplied to the component/device. It is noted that the terms "low-power state" and "low-power mode" can be used interchangeably herein.

In various implementations, computing system 100 can be at least a portion of a server, computer, laptop, mobile device, game console, streaming device, wearable device, or any of various other types of computing systems or devices. In various implementations, the components of computing system 100 are included in one or more integrated circuits (ICs) or system on chips (SoCs). It is noted that the number of components of computing system 100 can vary from implementation to implementation. For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
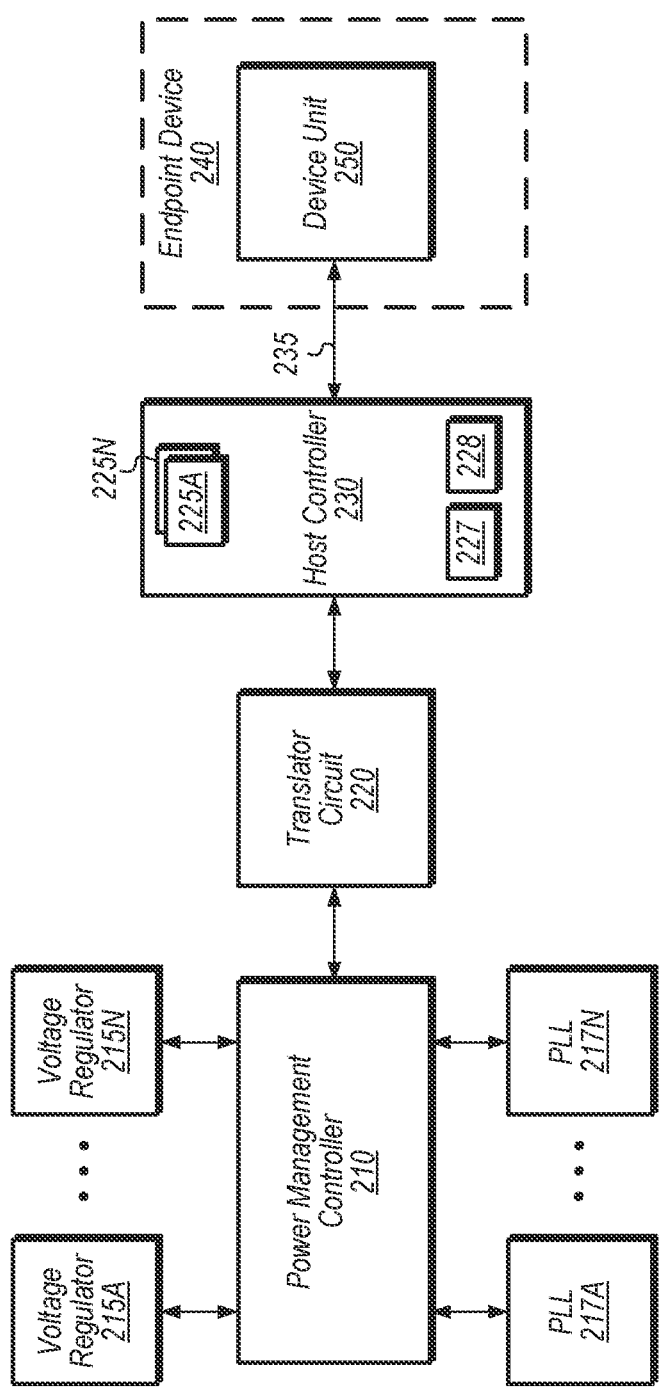
FIG. 2 is a block diagram of one implementation of a system.

Turning now to FIG. 2, a block diagram of one implementation of a system 200 is shown. In one implementation, system 200 includes at least power management controller 210, voltage regulators 215A-N, phase locked loops (PLLs) 217A-N, translator circuit 220, host controller 230, interface 235, and endpoint device 240. System 200 can also include any number of other components, processors, system memory, data fabric, and so on, that are not shown in FIG. 2 to avoid obscuring the figure. It is noted that host controller 230 can also be referred to herein as bus controller 230. In one implementation, device unit 250 and host controller 230 are configured to communicate in accordance with the USB standard. In other implementations, device unit 250 and host controller 230 are configured to communicate in accordance with other standards or a proprietary interface scheme.

A traditional approach for power management would be for host controller 230 to declare that if endpoint device 240 is transmitting anything, endpoint device 240 is not idle. Also, the traditional approach involves power management controller 210 concluding that endpoint device 240 is idle when software has put the endpoint device 240 to sleep. These approaches are limited in their applicability and do not capture the entirety of the scenarios that can be encountered in actual operating conditions. However, the approach used in system 200 is to notice that if endpoint device 240 is sending control packets or informative packets but not actually transferring data, then system 200 concludes that endpoint device 240 is essentially idle. This can be caused by endpoint device 240 sending control or handshaking information, with endpoint device 240 informing the host controller 230 that endpoint device 240 is still there on the bus 235 but is not ready to move data yet. In other words, even though the device 240 is active, the host controller 230 will treat the device 240 as though it were idle. So, even though the host controller 230 detects activity by the device 240, the host controller 230 is going to report that the device 240 is idle.

In one implementation, while endpoint device 240 is not sending any meaningful data, other than endpoint device 240 and host controller 230 transferring handshaking packets, then this scenario is defined as a new idle scenario. In this new idle scenario, data is not being transferred to memory. Also, in this implementation, a new idle indication is defined to represent this new idle scenario. During this new idle scenario, the various components (e.g., system memory, data fabric) of system 200 can be powered off by power management controller 210, but with power management controller 210 keeping enough power on for host controller 230 to communicate with endpoint device 240 for handshaking or status purposes. For example, in the new idle scenario, power management controller 210 maintains an always-on, or auxiliary rail, to provide enough power for host controller 230 to sustain communication with the device 240.

In one implementation, translator circuit 220 interfaces with host controller 230 and translates signals from host controller 230 into signals compatible with the interface to power management controller 210. It is noted that translator circuit 220 can reside in different locations depending on the implementation. In one implementation, the functionality of translator circuit 220 is included within host controller 230 and/or translator circuit 220 is located in the same device as host controller 230. In another implementation, translator circuit 220 is located on a separate device or as a standalone circuit in between power management controller 210 and host controller 230.

In one implementation, host controller 230 generates an activity vector 225A in response to detecting activity on interface 235 by device 240. In one implementation, this activity vector 225A is conveyed to translator circuit 220 and translated into idleness or active indicators which are forwarded to power management controller 210. In another implementation, activity vector 225A is compared to previously generated activity vectors (e.g., activity vector 225N) to determine whether device 240 is only sending handshaking or status information and can be considered to be in an idle state. In a further implementation, a header is retrieved from a packet sent by endpoint device 240 and compared to the predetermined headers stored in list 227. If the header matches any predetermined header in list 227, then endpoint device 240 is determined to be in an idle state. In other implementations, other techniques for assessing the status of device 240 are possible and are contemplated.

Figure 3:
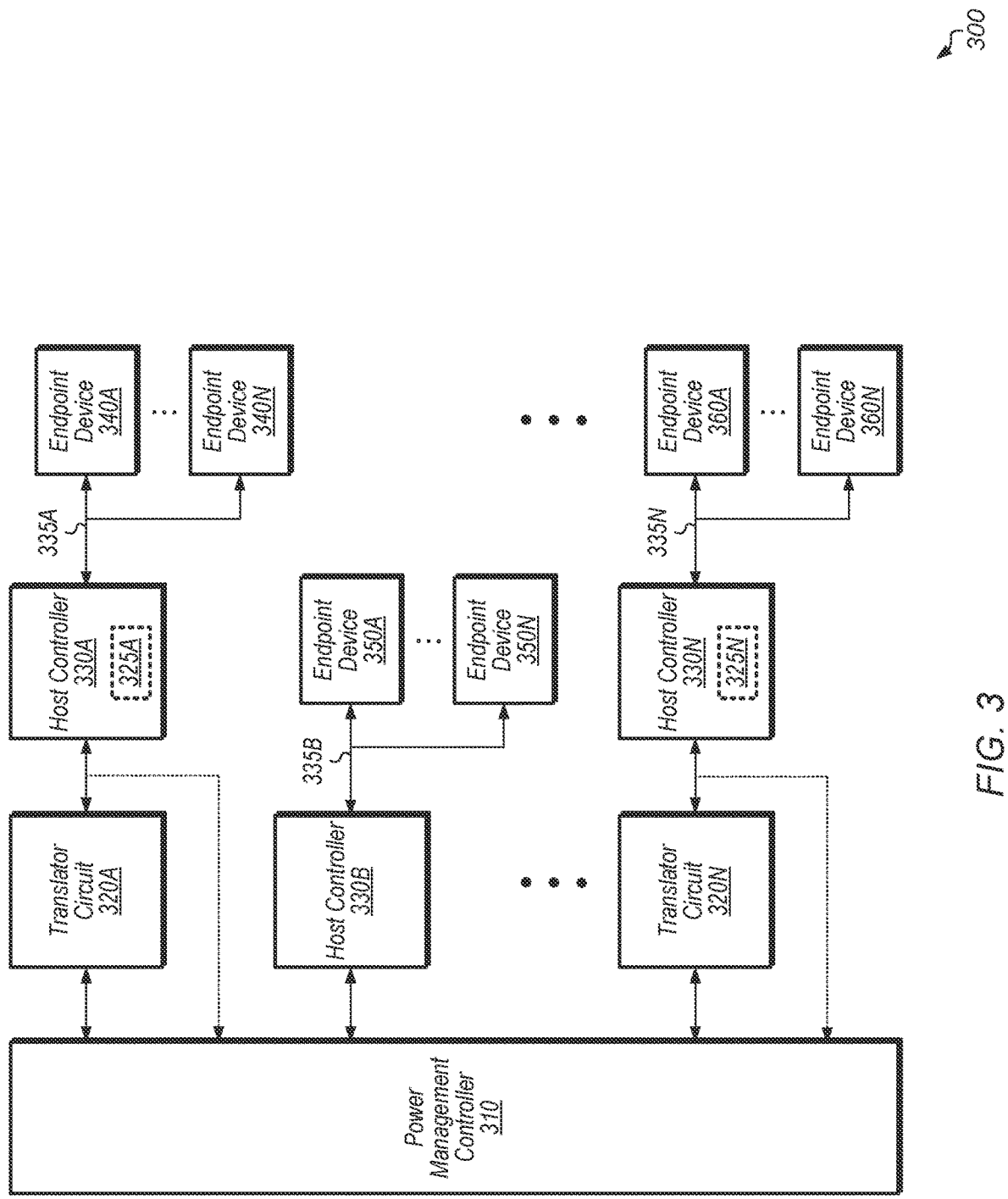
FIG. 3 is a block diagram of one implementation of a system with multiple host controllers and buses.

Referring now to FIG. 3, a block diagram of one implementation of a system 300 with multiple host controllers 330A-N and buses 335A-N is shown. System 300 includes power management controller 310, translator circuits 320A-N, host controllers 330A-N, buses 335A-N, and endpoint devices 340A-N, 350A-N, and 360A-N. It is noted that the value of "N" for each of the different components can vary from component to component. For example, the number of host controllers can differ from the number of endpoint devices per bus.

Depending on the implementation, system 300 can include any number and type of buses 335A-N. For example, in one implementation, bus 335A is compatible with the USB standard, bus 335B is compatible with the peripheral component interconnect express (PCI-E) standard, and bus 335N is compatible with the serial AT attachment (SATA) standard. In other implementations, buses 335A-N include other numbers and types of buses. It is also noted that the number and type of endpoint devices 340A-N, 350A-N, and 360A-N per bus can vary from implementation to implementation.

As shown in FIG. 3, host controller 330A is connected to power management controller 310 via translator circuit 320A while host controller 330B is connected directly to power management controller 310 without having a translator circuit interposed between. In this implementation, translator circuit 320A is able to increase the amount of time that the circuitry related to host controller 330A is able to spend in a low power-state. However, the direct connection of host controller 330B to power management controller 310 prevents the circuitry related to host controller 330B from entering low-power state except for periods of time with no bus activity on bus 335B or for periods of time when software explicitly puts components to sleep. In one implementation, host controller 330B is a legacy controller that does not have the capability to interact with a translator circuit. As shown in FIG. 3, host controller 330N is able to connect to power management controller 310 through translator circuit 320N to help increase the amount of time related components are able to enter low-power states.

In another implementation, host controller 330A optionally includes a translator circuit 325A, and host controller 330A optionally connects directly to power management controller 310. Also in this implementation, host controller 330N optionally includes a translator circuit 325N, and host controller 330N optionally connects directly to power management controller 310. In a further implementation, a first portion of translator circuit 320A is internal to host controller 330A while a second portion of translator circuit 320A is external to host controller 330A. Other ways of partitioning the functionality of translator circuit 320A into multiple locations are possible and are contemplated.

In one implementation, power management controller 320 includes circuitry for interfacing with multiple host controllers 330A-N with and without interposed translator circuits 320A-N. On system power-up, power management controller 310 detects the connected circuitry and determines which host controllers are operational and which host controllers also have attached translator circuits. This allows power management controller 320 to operate according to the preferred communication protocol for communicating, sharing, and responding to the appropriate power management related messages with host controllers 330A-N and translator circuits 320A-N.

Figure 4:
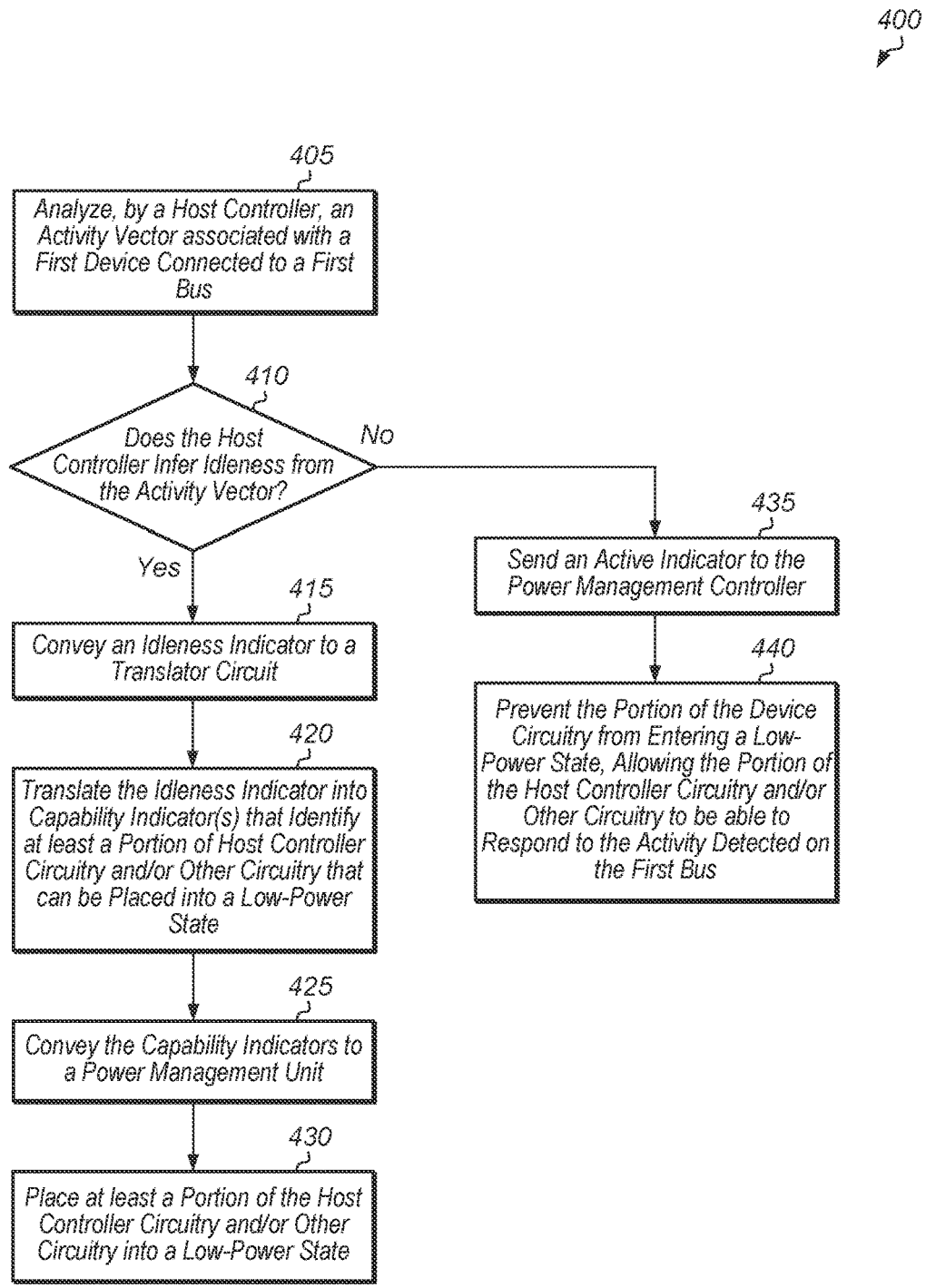
FIG. 4 is a generalized flow diagram illustrating one implementation of a method for reducing power consumption in bus-attached peripheral devices.

Turning now to FIG. 4, one implementation of a method 400 for reducing power consumption in bus-attached peripheral devices is shown. For purposes of discussion, the steps in this implementation and those of FIG. 5-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400 (and methods 500-900).

A host controller analyzes an activity vector associated with a first device connected to a first bus (block 405). If the host controller infers idleness from the activity vector (conditional block 410, "yes" leg), then the host controller conveys an idleness indicator to a translator circuit (block 415). One example of how a host controller could infer idleness from the activity vector is described in further detail in method 800 of FIG. 8. In one implementation, the translator circuit is a separate component from the host controller. In another implementation, the translator circuit is integrated within the host controller.

In response to receiving the idleness indicator, the translator circuit translates the idleness indicator into one or more capability indicator(s) that identify at least a portion of host controller circuitry and/or other circuitry that can be placed into a low-power state (block 420). Then, the translator circuit conveys the capability indicators to a power management controller (block 425). Next, in response to receiving the capability indicators, the power management controller places at least a portion of host controller circuitry and/or other circuitry into a low-power state (block 430). For example, in one implementation, the other circuitry that is placed into a low-power state can include at least the system memory. After block 430, method 400 ends.

If the host controller does not infer idleness from the activity vector (conditional block 410, "no" leg), then the host controller sends an active indicator to the power management controller (block 435). Depending on the implementation, the active indicator can be sent from the host controller to the power management controller directly or via the translator circuit. In response to receiving the activity indicator, the power management controller prevents the portion of host controller circuitry and/or other circuitry from entering a low-power state, allowing the circuitry to be able to respond to the activity detected on the first bus (block 440). After block 440, method 400 ends.

Figure 5:
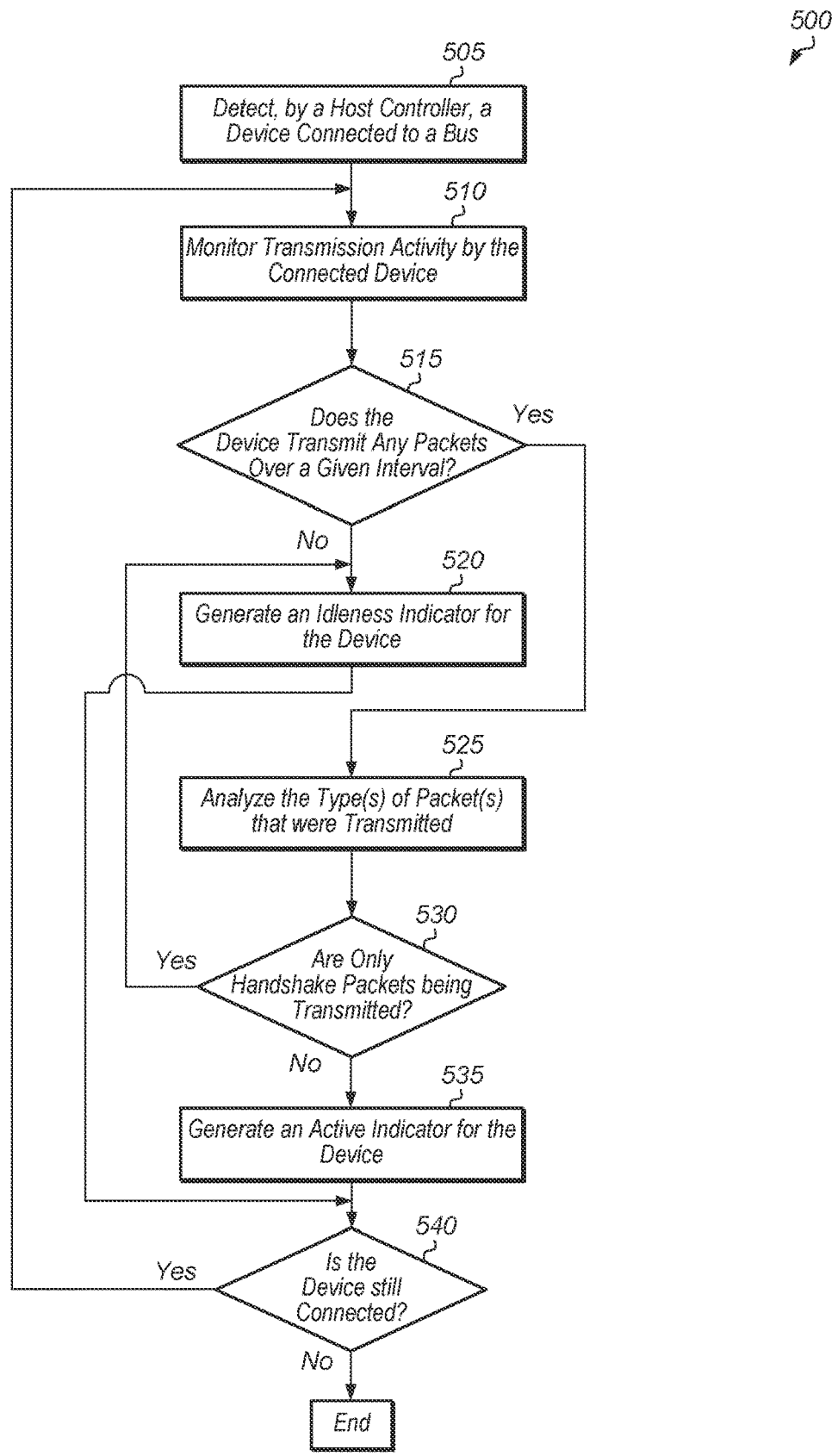
FIG. 5 is a generalized flow diagram illustrating one implementation of a method for generating idleness or active indicators.

Referring now to FIG. 5, one implementation of a method 500 for generating idleness or active indicators is shown. A host controller detects a device connected on a bus (block 505). It is noted that there may be many devices connected to the bus, but method 500 is described in terms of a single connected device. When multiple devices are connected to the bus, a separate instance of method 500 can be performed for each connected device, or alternatively, appropriate modifications can be made to method 500 to adapt to the multi-device scenario. The host controller monitors transmission activity by the connected device (block 510). If over a given period of time, if the device does not transmit any packets (conditional block 515, "no" leg), then the bus controller generates an idleness indicator for the device (block 520). The duration of the given period of time can vary from implementation to implementation.

Otherwise, if during the given period of time, the device transmits at least one packet (conditional block 515, "yes" leg), then the bus controller analyzes the type(s) of packet(s) that were transmitted (block 525). If the only packet type(s) detected are handshake packets (e.g., negative acknowledgement (NAK) packets) (conditional block 530, "yes" leg), then the bus controller generates an idleness indicator for the device (block 520). For example, in one implementation, if the packet type is a handshake packet sent on according to a regular schedule (i.e., on a predictable interval), then the bus controller generates an idleness indicator for the device. If the packet type(s) are other types of packets besides handshake packets (conditional block 530, "yes" leg), then the bus controller generates an active indicator for the device (block 535). After blocks 520 and 535, if the device is still connected (conditional block 540, "yes" leg), then method 500 returns to block 510. Otherwise, if the device is not connected (conditional block 540, "no" leg), then method 500 ends.

Figure 6:
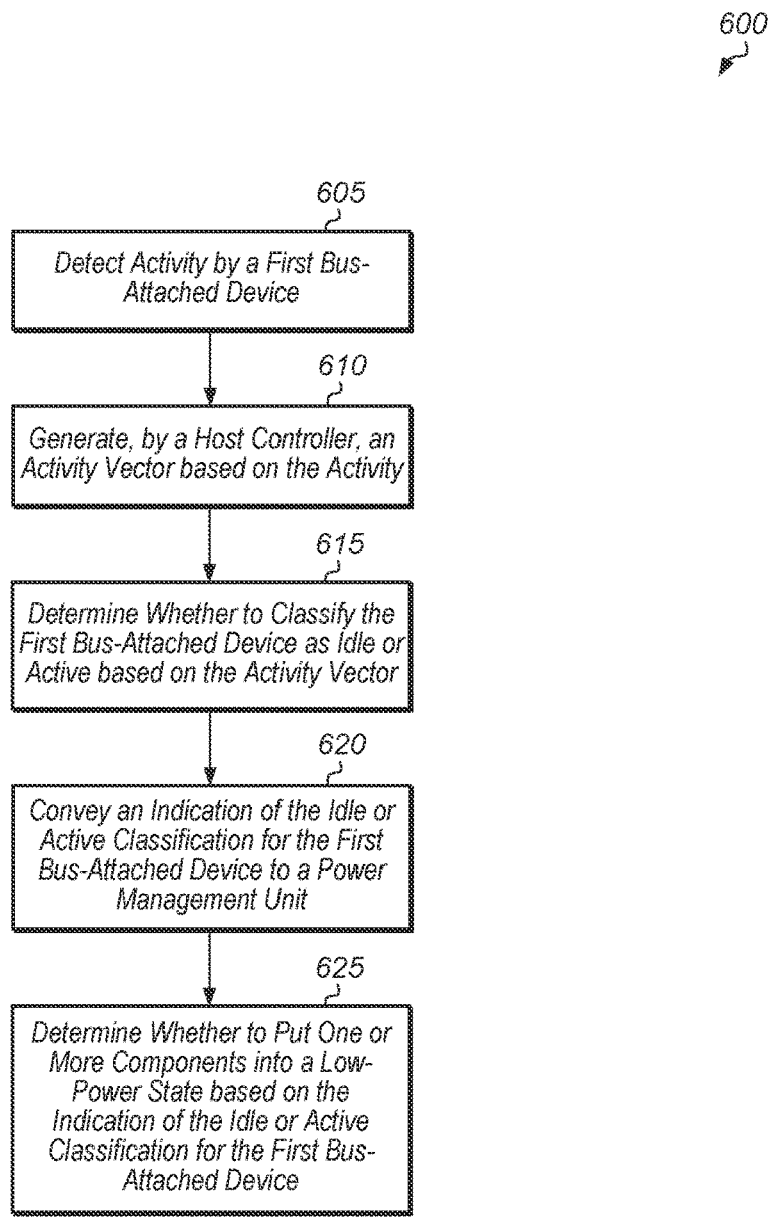
FIG. 6 is a generalized flow diagram illustrating one implementation of a method for classifying a device based on an activity vector.

Turning now to FIG. 6, one implementation of a method 600 for classifying a device based on an activity vector is shown. A host controller detects activity by a first bus-attached device (block 605). The host controller generates an activity vector based on the activity (block 610). One example of generating an activity vector is described in further detail below in the discussion of method 700 (of FIG. 7). Next, the host controller determines whether to classify the first bus-attached device as idle or active based on the activity vector (block 615). Then, the host controller conveys an indication of the idle or active classification to a power management unit (block 620). Depending on the implementation, the host controller can send the indication to the power management unit via a translation circuit or the host controller can send the indication directly to the power management unit. Next, the power management unit determines whether to put one or more components (e.g., system memory) into a low-power state based on the indication of the idle or active classification for the first bus-attached device (block 625). After block 625, method 600 ends.

Figure 7:
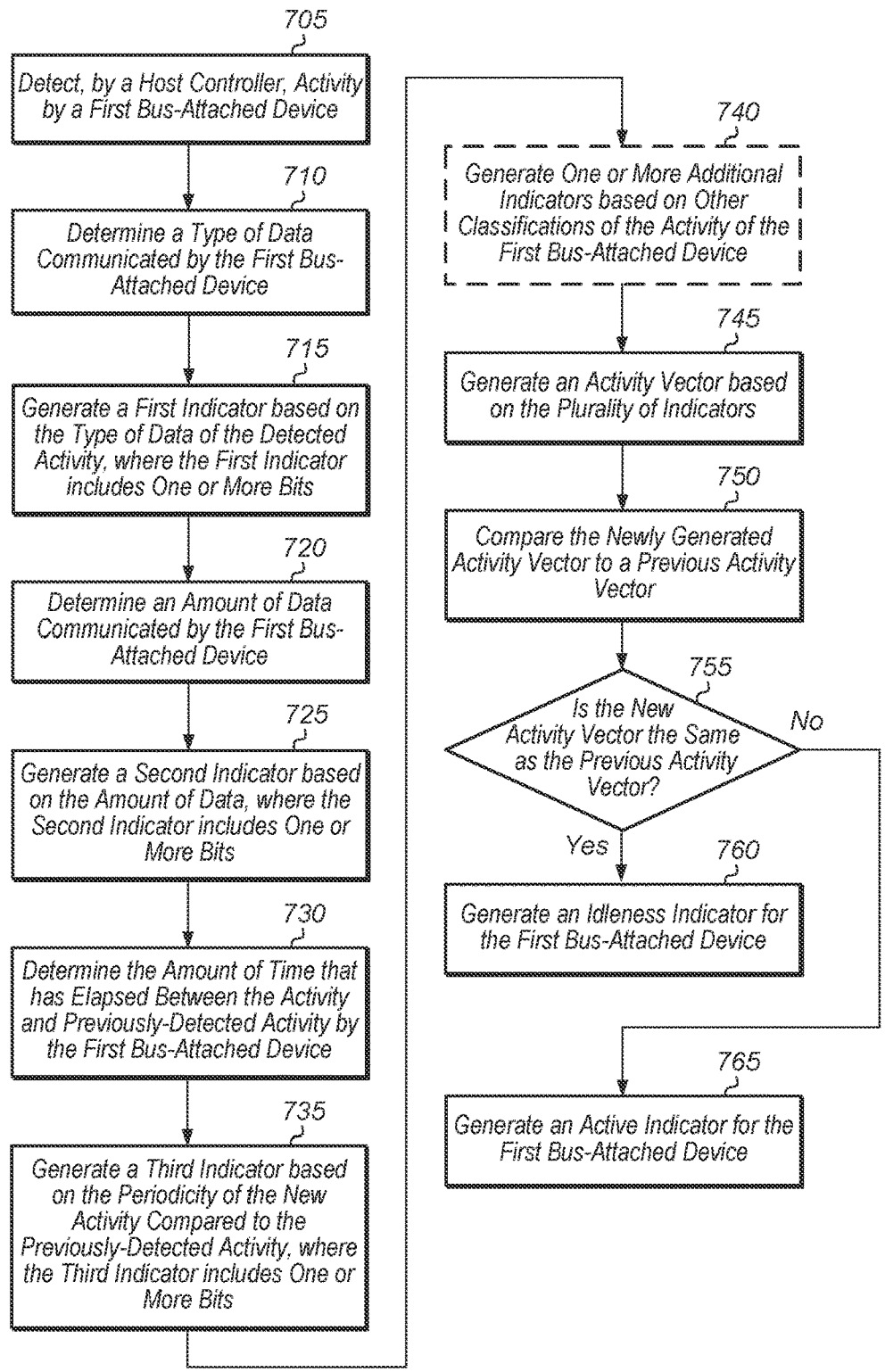
FIG. 7 is a generalized flow diagram illustrating one implementation of a method for generating and analyzing an activity vector.

Referring now to FIG. 7, one implementation of a method 700 for generating and analyzing an activity vector is shown. A host controller detects activity by a first bus-attached device (block 705). The host controller determines a type of data communicated by the first bus-attached device (block 710). The host controller generates a first indicator based on the type of data, where the first indicator includes one or more bits (block 715). The host controller determines an amount of data communicated by the first bus-attached device (block 720). The host controller generates a second indicator based on the amount of data, where the second indicator includes one or more bits (block 725). For example, in one implementation, the second indicator is a value indicating the amount of data, such as "00" for less than a first threshold, "01" for greater than the first threshold and less than a second threshold, "10" for greater than the second threshold and less than a third threshold, and "11" for greater than the third threshold. In other implementations, other numbers of bits may be used for the second indicator and other ways of encoding the amount of data sent or received by the first bus-attached device. The host controller determines the amount of time between the activity and previously-detected activity by the first bus-attached device (block 730). The host controller generates a third indicator based on the periodicity of the new activity compared to the previously-detected activity, where the third indicator includes one or more bits (block 735). For example, the third indicator can specify whether the new activity is determined to be at a predictable interval as compared to the previous activity, indicating that the new activity is likely to include only status or handshaking information rather than an actual data transmission.

The host controller optionally generates one or more additional indicators based on other classifications of the activity of the first bus-attached device (block 740). Next, the host controller generates an activity vector based on the plurality of indicators (block 745). For example, in one implementation, the host controller generates the activity vector as a concatenation of the plurality of indicators. In other implementation, the host controller generates the activity vector from the plurality of indicators using other techniques. Then, the host controller compares the newly generated activity vector to a previous activity vector (block 750). If the new activity vector is the same, or substantially the same, as the previous activity vector (conditional block 755, "yes" leg), then the host controller generates an idleness indicator for the first bus-attached device (block 760). It is noted that the idleness indicator may also be referred to as an idle indicator. The rationale behind generating an idleness indicator in this case is that if the new activity vector is the same, or substantially the same, as the previous vector, this means that the activity is likely a handshaking or status packet rather than the transfer of data. The definition of substantially the same can be a threshold number of bits in the new activity vector being the same as previous activity vector, with the threshold number varying according to the implementation. After block 760, method 700 ends. In other implementations, the comparison of the new activity vector to the previous activity vector is only one factor of a plurality of factors which influences the decision on whether to generate an idleness or active indicator for the bus-attached device. Other factors which can be used are described in further detail below in the discussions of methods 800 and 900 (of FIGS. 8 and 9, respectively). Additional factors for influencing the decision on whether to generate an idleness or active indicator for the bus-attached device are possible and are contemplated.

Otherwise, if the new activity vector is not the same, or not substantially the same, as the previous vector (conditional block 755, "no" leg), then the host controller generates an active indicator for the first bus-attached device (block 765). After block 765, method 700 ends. It is noted that multiple instances of method 700 can be performed by the host controller, with other instances performed for a second bus-attached device, a third bus-attached device, a fourth bus-attached device, and so on.

Figure 8:
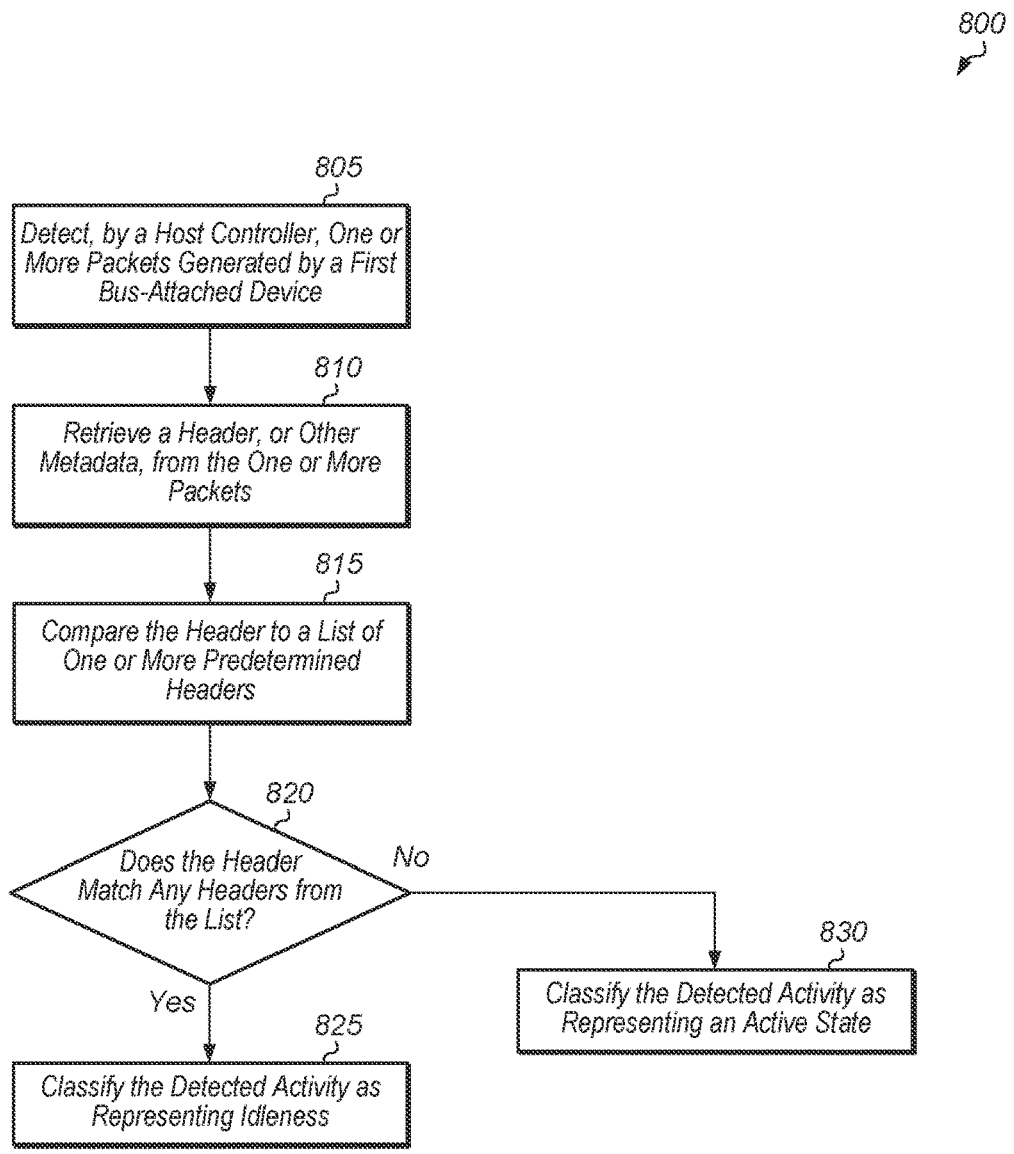
FIG. 8 is a generalized flow diagram illustrating one implementation of a method for classifying activity of a bus-attached device.

Referring now to FIG. 8, one implementation of a method 800 for classifying activity of a bus-attached device is shown. A host controller detects one or more packets generated by a first bus-attached device (block 805). The host controller retrieves a header (or other metadata) from the one or more packets (block 810). The host controller compares the header (or metadata) retrieved from the packet to a list of one or more predetermined headers (block 815). If the retrieved header matches any predetermined header from the list (conditional block 820, "yes" leg), then the host controller classifies the detected activity as representing idleness (block 825). Otherwise, if the retrieved header does not match any of the predetermined headers from the list (conditional block 820, "no" leg), then the host controller classifies the detected activity as representing an active state (block 830). After blocks 825 and 830, the host controller conveys the classification of the detected activity to a power management controller (block 835). Alternatively, in another implementation, blocks 825 and 830 may be swapped, such that the retrieved header matching a predetermined header from the list meaning that the detected activity is classified as indication of an active state, while the retrieved header not matching any of the predetermined headers from the list signifying that the detected activity is classified as an indication of idleness.

Figure 9:
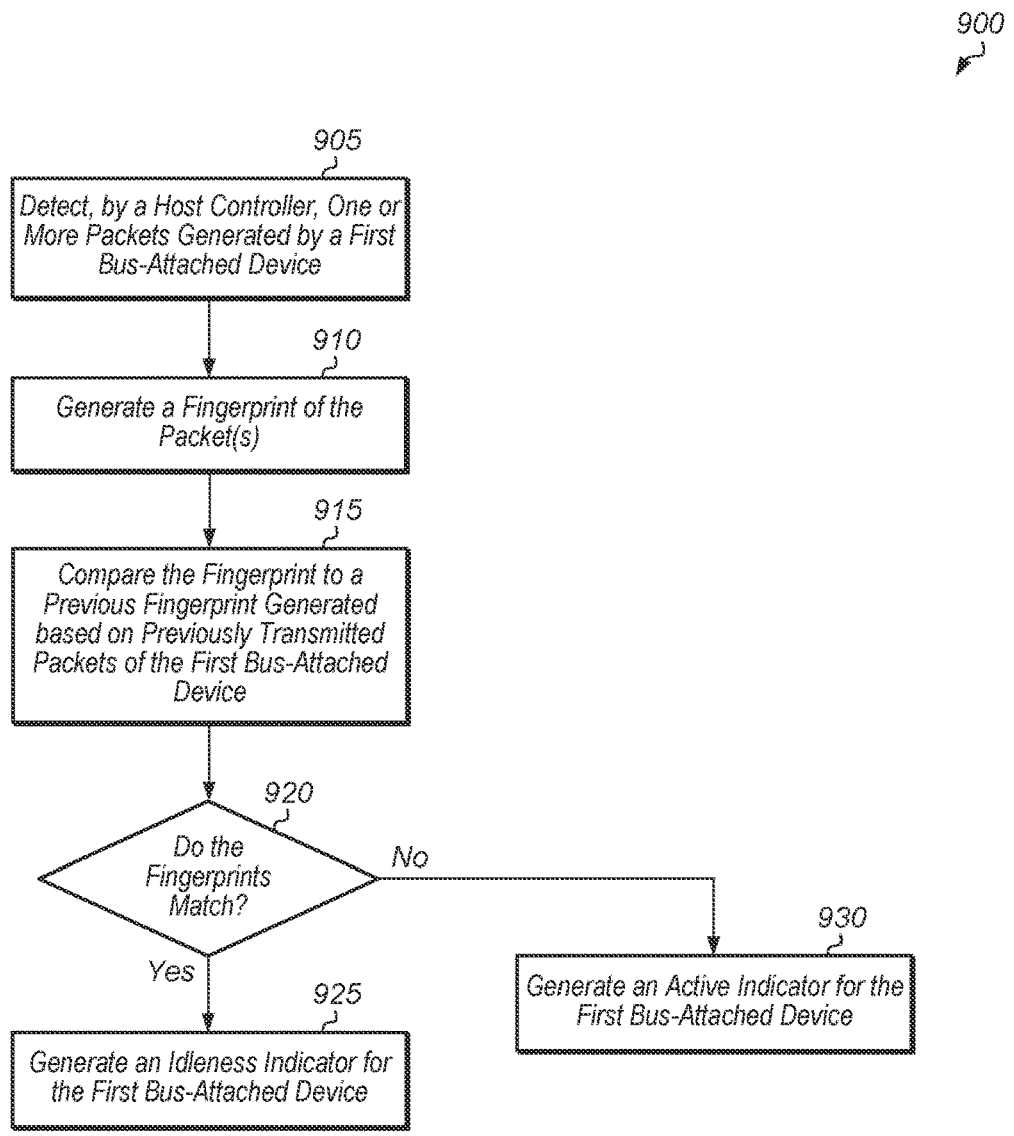
FIG. 9 is a generalized flow diagram illustrating one implementation of a method for classifying activity of a bus-attached device.

Referring now to FIG. 9, one implementation of a method 900 for classifying activity of a bus-attached device is shown. A host controller detects one or more packets generated by a first bus-attached device (block 905). The host controller generates a fingerprint of the packet(s) (block 910). For example, in one implementation, the host controller can generate a hash of the data of the one or more packets. In other implementations, the fingerprint can be generated from the packet(s) using other techniques. Next, the host controller compares the fingerprint to a previous fingerprint generated based on previously transmitted packets of the first bus-attached device (block 915). If the fingerprints match (conditional block 920, "yes" leg), then the host controller generates an idleness indicator for the first bus-attached device (block 925). Otherwise, if the fingerprints do not match (conditional block 920, "no" leg), then the host controller generates an active indicator for the first bus-attached device (block 930). After blocks 925 and 930, method 900 ends. It is noted that the active indicator can also be referred to herein as an awake indicator.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
an interface configured to receive data, including auxiliary data and payload data; and
a host controller comprising circuitry configured to:
receive, via the interface, first data generated by a device attached to the interface; and
responsive to the first data comprising auxiliary data and excluding payload data:
convey a first indication that the device is idle, including when the device continues to send auxiliary data to the host controller; and
cause one or more components to enter a low-power state.

2. The apparatus as recited in claim 1, wherein the one or more components include at least one of a portion of the host controller and a memory external to the apparatus.

3. The apparatus as recited in claim 1, wherein the first data indicates the device only requires communication with the host controller.

4. The apparatus as recited in claim 1, wherein the host controller is configured to convey the first indication to a translation circuit, and the translation circuit is configured to translate the indication into a capability indicator that identifies at least one of the one or more components.

5. The apparatus as recited in claim 4, wherein:
the translation circuit is configured to convey the capability indicator to a power management controller; and
the power management controller is configured to put the one or more components into the low-power state.

6. The apparatus as recited in claim 1, wherein the host controller conveys the first indication in further response to an amount of time between receipt of the first data and receipt of second handshaking data corresponding to a given interval.

7. The apparatus as recited in claim 1, wherein said auxiliary data comprises at least one of: token packets, handshake packets, start of frame packets, control packets, status information, handshaking information, protocol-specific signaling data, or any other administrative or auxiliary type of data used to support proper transfer of payload data, including such data in systems that do not utilize packets.

8. A method comprising:
detecting, by circuitry of a host controller, first data generated by a device connected to the host controller; and
responsive to the first data comprising auxiliary data and excluding payload data:
conveying a first indication that the device is idle, including when the device continues to send auxiliary data to the host controller; and causing at least one component to be placed in a low-power state.

9. The method as recited in claim 8, further comprising generating, by the host controller, a first activity vector based on the first data generated by the device.

10. The method as recited in claim 8, wherein the first data further comprises status information.

11. The method as recited in claim 8, further comprising conveying the first indication in further response to an amount of time between receipt of the first data and previous receipt of second handshaking data corresponding to a given interval.

12. The method as recited in claim 9, further comprising generating the first indication that the device is idle responsive further to the first activity vector matching a second activity vector of previously generated data by the device.

13. The method as recited in claim 8, further comprising retrieving a header from one or more packets generated by the device.

14. The method as recited in claim 13, further comprising:
comparing the header to a list of predetermined headers; and
generating the first indication that the device is idle based on the header matching a given predetermined header from the list.

15. A system comprising:
a host controller comprising circuitry configured to convey a first indicator, responsive to receipt of first data generated by a device;
a power management controller; and
a translator circuit; and
wherein responsive to the first data corresponding to a first type of data:
the translator circuit is configured to:
convert the first indicator into a second indicator that indicates the device is idle; and
convey the second indicator to the power management controller;
wherein the power management controller comprises circuitry configured to cause one or more components to enter a low-power state if not already in a low-power state, or remain in a low-power state if already in a low-power state, responsive to receiving the second indicator.

16. The system as recited in claim 15, wherein the first data corresponding to the first type of data generated by the device is a handshaking packet.

17. The system as recited in claim 15, wherein the first indicator is an activity vector.

18. The system as recited in claim 17, wherein the activity vector comprises one or more bits representing an amount of data transmitted by the device.

19. The system as recited in claim 17, wherein the activity vector comprises one or more bits representing a periodicity of transmissions between receipt of the first data and at least previous receipt of second data of the first type of data.

* * * * *